United States Patent [19]

Rondeau

[11] Patent Number: 5,548,674
[45] Date of Patent: Aug. 20, 1996

[54] HIGH PRECISION FIBEROPTIC ALIGNMENT SPRING RECEPTACLE AND FIBEROPTIC PROBE

[75] Inventor: Michel Y. Rondeau, San Jose, Calif.

[73] Assignees: Fibotech, Inc., San Jose, Calif.; Valquest Medical, Inc., San Antonio, Tex.

[21] Appl. No.: 247,472

[22] Filed: May 23, 1994

Related U.S. Application Data

[60] Continuation of Ser. No. 844,562, filed as PCT/US90/04959 Aug. 28, 1990, abandoned, which is a division of Ser. No. 399,914, Aug. 29, 1989, abandoned.

[51] Int. Cl.⁶ .................................................. G02B 6/30
[52] U.S. Cl. .................................................. 385/72; 385/81
[58] Field of Search .................................. 385/70, 71, 72, 385/81, 77, 78, 84, 66, 60, 67

[56] References Cited

U.S. PATENT DOCUMENTS

| | | | |
|---|---|---|---|
| 4,023,886 | 5/1977 | Nakayama et al. | 385/80 |
| 4,076,379 | 2/1978 | Chouniard | 385/73 |
| 4,140,366 | 2/1979 | Makuch et al. | 385/58 |
| 4,140,367 | 2/1979 | Malach et al. | 385/59 |
| 4,162,119 | 7/1979 | Goodman | 385/60 |
| 4,173,389 | 11/1979 | Curtis | 385/92 |
| 4,178,068 | 12/1979 | Hoover | 385/60 |
| 4,193,665 | 3/1980 | Arnold | 385/72 |
| 4,205,897 | 6/1980 | Stankos | 385/60 |
| 4,208,093 | 6/1980 | Borsuk | 385/85 |
| 4,218,113 | 8/1980 | Uberbacher | 385/72 |
| 4,260,382 | 4/1981 | Thomson | 285/136 |
| 4,300,815 | 11/1981 | Malsot et al. | 385/81 |
| 4,310,218 | 1/1982 | Kavol | 350/96.21 |
| 4,370,022 | 1/1983 | Johnson | 385/64 |
| 4,470,660 | 9/1984 | Hillegonds et al. | 385/58 |
| 4,678,264 | 7/1987 | Bowen et al. | 385/89 |
| 4,687,292 | 8/1987 | Krausse | 385/78 |
| 4,693,550 | 9/1987 | Brown et al. | 385/81 |
| 4,740,047 | 4/1988 | Abe et al. | 385/84 |
| 4,750,803 | 6/1988 | Schmidt | 385/72 |
| 4,752,111 | 6/1988 | Fisher | 385/55 |
| 4,767,181 | 8/1988 | McEowen | 385/78 |
| 4,785,139 | 11/1988 | Lynch et al. | 174/70 |
| 4,787,706 | 11/1988 | Cannon, Jr. et al. | 385/59 |
| 4,869,571 | 9/1989 | Hübner et al. | 385/77 |
| 4,946,236 | 8/1990 | Dautartus et al. | 385/17 |
| 4,979,793 | 12/1990 | Bowen et al. | 385/140 |
| 5,042,900 | 8/1991 | Parker | 385/76 |
| 5,113,464 | 5/1992 | Wall | 385/81 |
| 5,140,662 | 8/1992 | Kumar | 385/87 |
| 5,216,735 | 6/1993 | Rondeau | 385/78 |
| 5,275,596 | 1/1994 | Long et al. | 606/28 |
| 5,276,752 | 1/1994 | Guglemeyer et al. | 385/69 |
| 5,282,258 | 1/1994 | Hoshino | 385/70 |
| 5,305,406 | 4/1994 | Rondeau | 385/81 |

FOREIGN PATENT DOCUMENTS

| | | | |
|---|---|---|---|
| 0014610 | 8/1980 | European Pat. Off. | 350/96.2 |
| 3308679 | 9/1984 | Germany | 350/96.21 |
| 53-6047 | 1/1978 | Japan . | |
| 57-34514 | 2/1982 | Japan . | |
| 63-250614 | 10/1988 | Japan . | |

Primary Examiner—John Ngo
Attorney, Agent, or Firm—Robert O. Guillot

[57] ABSTRACT

A fiberoptic receptacle including a housing having a central bore that is adapted foe holding a high precision cylindrical alignment spring. The central diameter of the cylindrical spring is less than the outer diameter of the ferrule of an optical fiber connector that is inserted therewithin, such that the ferrule is accurately and repeatably centrally aligned by the resilient force of the spring elements of the cylindrical spring. A cylindrical spring engagement method involves applying a longitudinal force to the wall of the cylindrical spring during the affixation of the spring within the receptacle bore. Due to the nature of the cylindrical spring, the longitudinal force is translated into an increased radial displacement of the spring element to enhance the alignment capability of the spring. A fiberoptic medical probe includes the cylindrical spring within the receptacle of the probe. Alternative embodiments of the medical probe permit air cooling of the probe to facilitate prolonged handheld use of the probe.

6 Claims, 8 Drawing Sheets

FIG. 15  AXIAL DEFLECTION SPRING (INCHES) (D)

HIGH PRECISION FIBEROPTIC ALIGNMENT SPRING RECEPTACLE AND FIBEROPTIC PROBE

This is a continuation of application Ser. No. 07/844,562, filed as PCT/US90/04959, Aug. 28, 1990 now abandoned, which is a division of Ser. No. 07/399,914 filed Aug. 29, 1989, now abandoned.

BACKGROUND OF THE INVENTION

1. Field of the Invention

The present invention relates generally to receptacles and connectors for fiberoptic cable, and more particularly to a fiberoptic receptacle and connector having an alignment spring that provides a repeatable, high precision optical fiber connection, with a particular embodiment of a fiberoptic medical probe.

2. Description of the Prior Art

Figure 4:
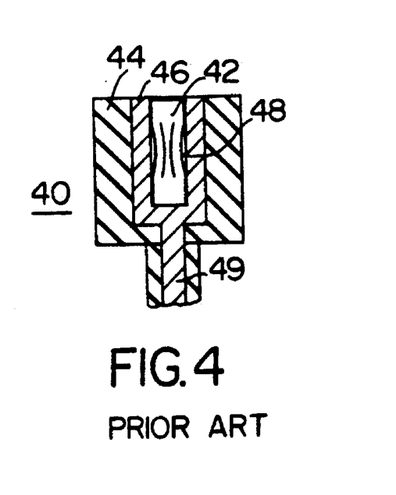
FIG. 4 is a cross-sectional view of a prior art electrical connector utilizing an electrically conductive cylindrical spring.
Figure 5:
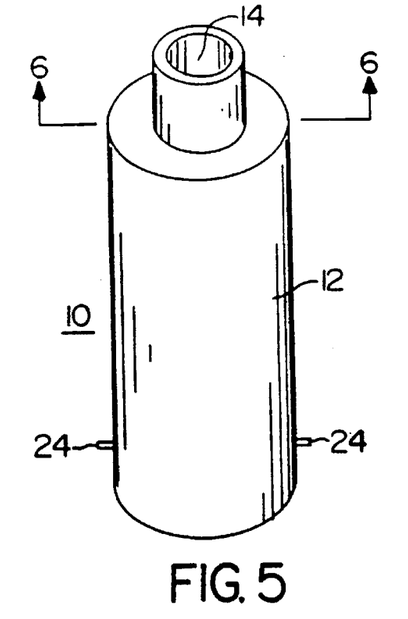
FIG. 5 is a perspective view of a fiberoptic receptacle of the present invention.

A preferred embodiment of the present invention is depicted in FIG. 5. It includes a cylindrical spring member that is centrally disposed within an optical fiber connector receptacle. A cylindrical spring member is depicted in detail in FIGS. 1, 2 and 3. Electrically conductive cylindrical spring members are well known in the prior art for use as electrical connectors, as depicted in FIG. 4.

Figure 2:
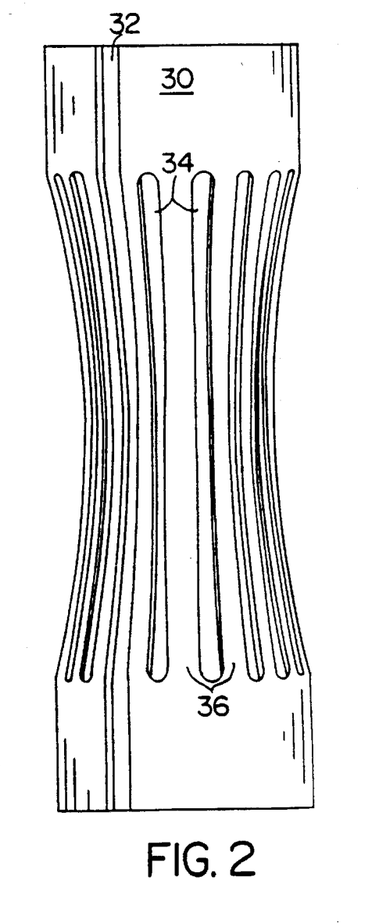
FIG. 2 is a side elevational view of a cylindrical spring.
Figure 3:
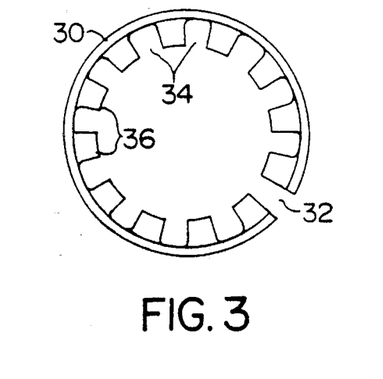
FIG. 3 is a top plan view of a cylindrical spring.

As depicted in FIGS. 1, 2, 3 and 4, the prior art electrical connector spring is composed of a metallic electrically-conductive resilient material such as copper. Good electrical connection is provided when a bare electrical wire whose diameter is greater than the minimum diameter between the spring elements is inserted into the spring. The wire thus causes the spring elements to separate and the resiliency of the spring elements creates a good electrical contact. As depicted in FIG. 4, the spring member is held in a metallic, electrically-conductive housing, such that good electrical contact is made between the housing, spring and electrical wire that is inserted centrally into the spring.

Japanese patent 57-34514 issued Feb. 24, 1982 to Shigihara discloses an optical device comprising a housing having a bore, ferrules, a resilient means, and a ferrule connection means. However, the spring elements of Shigihara are individual members that are not integrally formed with the wall of the cylindrical spring. The spring elements of Shigihara are separate members that are engaged in slots within end members. U.S. Pat. No. 4,193,665 issued Mar. 18, 1980 to Arnold discloses a cylindrical spring-type device having indented portions that serve to urge inserted ferrules to the central axis of the connector bore. However, Arnold's device lacks the longitudinal slots that are formed in the cylindrical spring of the present invention, whereby the cylindrical spring of the present invention is more flexible. European Patent 14,610, issued August, 1980 to Jacques discloses a further optical connector having a ferrule alignment device. The Jacques alignment device appears to be a solid member, as is Arnold, and therefore lacks the resiliency of the independent, integrally formed spring members of the cylindrical spring utilized in applicant's device. U.S. Pat. No. 4,310,218 issued Jan. 12, 1982 to Karol, U.S. Pat. No. 4,178,068 issued Dec. 11, 1979 to Hoover and U.S. Pat. No. 4,140,367 issued Feb. 20, 1979 to Makuch et al., each describe a connector for multiple fiberoptic cables. None of these devices contain a cylindrical alignment spring within each receptacle bore, much less the type of alignment spring utilized by applicant.

Applicant is also aware of further prior art including U.S. Pat. No. 4,678,264 issued Jul. 7, 1987 to Bowen et al., Japanese Patent 63-250,614 issued Oct. 18, 1988 to Nagasawa and Japanese Patent 53-6047 issued Jan. 20, 1978 to Yonechi which appear to teach relevant, though cumulative, fiberoptic receptacle concepts.

SUMMARY OF THE INVENTION

It is an object of the present invention to provide a fiberoptic receptacle that quickly and accurately facilitates the joinder of fiberoptic cables.

It is another object of the present invention to provide a fiberoptic receptacle having an alignment spring disposed therewithin to facilitate the quick, accurate joinder of fiberoptic cables.

It is a further object of the present invention to provide a fiberoptic receptacle having an alignment spring that repeatedly distorts in a substantially identical manner upon the repeated insertion of an optical fiber ferrule therein, such that an accurate, quick connection of fiberoptic cables can be accomplished.

It is still another object of the present invention to provide an optical fiber connector having a high precision spring disposed therewithin, such that two optical fiber ferrules may be quickly and accurately joined together.

It is still a further object of the present invention to provide a fiberoptic cable multi-connector receptacle having a plurality of high precision alignment springs disposed therewithin, such that a plurality of optical fibers combined in a single connector may be quickly, accurately and repeatedly joined to the receptacle.

It is yet another object of the present invention to provide a fiberoptic receptacle having an alignment spring disposed therewithin that is pre-loaded with an axial pressure mounting that enhances the radial spring force of the individual spring elements.

It is yet a further object of the present invention to provide a method for mounting a cylindrical alignment spring within a fiberoptic receptacle to provide an axial pressure upon the alignment spring that creates an adjustable radial alignment force on the individual spring elements of the alignment spring.

It is still another object of the present invention to provide a fiberoptic medical probe having a fiberoptic receptacle disposed therewithin, such that said medical probe may be easily connected to a ferrule of an optical fiber.

It is still a further object of the present invention to provide a fiberoptic medical probe having an axial air or liquid cooling bore disposed therewithin.

The present invention includes a housing having a central bore that is adapted for holding a high precision cylindrical alignment spring. The central diameter of the cylindrical spring is less than the outer diameter of the ferrule of an optical fiber connector that is inserted therewithin, such that the ferrule is accurately and repeatably centrally aligned by the resilient force of the spring elements of the cylindrical spring.

In another embodiment, an elongated cylindrical spring is centrally disposed within the bore of a two-ended connector, such that two ferrules may be inserted therewithin in opposing relationship and the spring will act to repeatedly, accurately align the two ferrules.

In another preferred embodiment of the present invention, a receptacle having a plurality of connection bores includes a cylindrical spring disposed within each connection bore. A mating connector having a plurality of ferrules projecting therefrom may be repeatedly, accurately joined with the receptacle owing to the disposition of the springs within the connecting bores.

A cylindrical spring engagement method may be utilized in each of the devices disclosed herein. The engagement method involves applying a longitudinal force to the wall of the cylindrical spring during the affixation of the spring within the receptacle bore. Due to the nature of the cylindrical spring, the longitudinal force is translated into an increased radial displacement of the spring element to enhance the alignment capability of the spring.

The fiberoptic medical probe of the present invention includes the cylindrical spring within the receptacle of the probe. Alternative embodiments of the medical probe permit air cooling of the probe to facilitate prolonged handheld use of the probe. The utilization of the cylindrical spring of the present invention within the probe, permits the probe to be disposed of following use with minimal wastage of material.

It is an advantage of the present invention that provides a fiberoptic receptacle that quickly and accurately facilitates the joinder of fiberoptic cables.

It is another advantage of the present invention that it provides a fiberoptic receptacle having an alignment spring disposed therewithin to facilitate the quick, accurate joinder of fiberoptic cable.

It is a further advantage of the present invention that it provides a fiberoptic receptacle having an alignment spring that repeatedly distorts in a substantially identical manner upon the repeated insertion of an optical fiber ferrule therein, such that an accurate, quick connection of fiberoptic cables can be accomplished.

It is still another advantage of the present invention that it provides an optical fiber connector having a high precision spring disposed therewithin, such that two optical fiber ferrules may be quickly and accurately joined together.

It is still a further advantage of the present invention that it provides a fiberoptic cable multi-connector receptacle having a plurality of high precision alignment springs disposed therewithin, such that a plurality of optical fibers combined in a single connector may be quickly, accurately and repeatedly joined to the receptacle.

It is yet another advantage of the present invention that it provides a fiberoptic receptacle having an alignment spring disposed therewithin that is pre-loaded with an axial pressure mounting that enhances the radial spring force of the individual spring elements.

It is yet a further advantage of the present invention that it provides a method for mounting a cylindrical alignment spring within a fiberoptic receptacle to provide an axial pressure upon the alignment spring that creates an adjustable radial alignment force on the individual spring elements of the alignment spring.

It is still another advantage of the present invention that it provides a fiberoptic medical probe having a fiberoptic receptacle disposed therewithin, such that said medical probe may be easily connected to a ferrule of an optical fiber.

It is still a further advantage of the present invention that it provides a fiberoptic medical probe having an axial air or liquid cooling bore disposed therewithin.

These and other objects and advantages of the present invention will become apparent from the following description and the accompanying drawings.

DESCRIPTION OF THE PREFERRED EMBODIMENT

Figure 6:
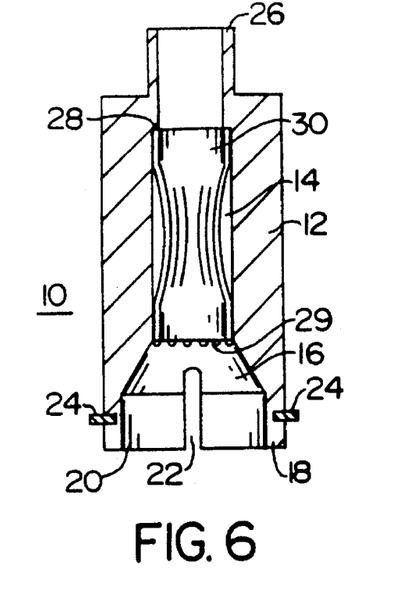
FIG. 6 is a cross-sectional view of a fiberoptic receptacle taken along lines 6—6 of FIG. 5.
Figure 7:
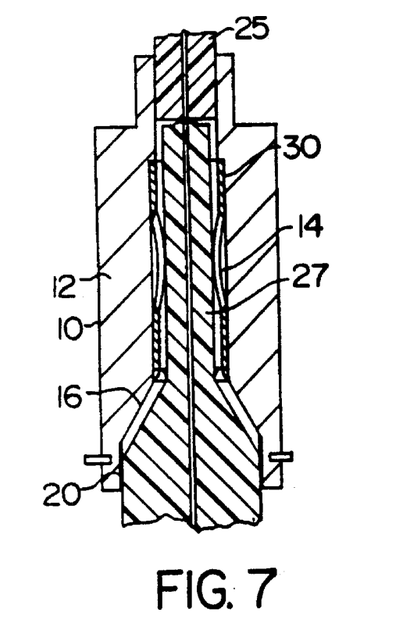
FIG. 7 is a cross-sectional view of the receptacle as depicted in FIG. 6 and showing a fiberoptic ferrule and fiberoptic cable disposed for connection within the receptacle.

FIGS. 5 and 6 depict a fiberoptic receptacle of the preferred embodiment. FIG. 6 is a cross-sectional view taken along lines 6—6 of FIG. 5. The receptacle 10 includes a cylindrical housing 12 having a cylindrical bore that is centrally disposed along the longitudinal axis of the housing 12. The bore 14 is tapered outwardly in a cone-shaped portion 16 toward the receptacle input end 18, and a further cylindrical bore portion 20 that has a larger diameter than the central bore 14 is formed proximate the receptacle input end 18. An alignment slot 22 is formed through a wall of the housing proximate the outer bore 20 and cone-shaped bore portion 16 to facilitate the alignment of an optical cable ferrule within the housing 12, and bayonet-type projections 24 project laterally from the housing 12 proximate the receptacle input end 18 for the joinder of a ferrule connector therewith. The bore 14 terminates at an output end 26 of the housing 12. The portions of the present invention described thus far in this paragraph are known in the prior art. A drawback of the prior art receptacle is that the diameter of the bore 14 must closely match the diameter of the ferrule that is inserted therein, whereby the optical fiber that is centrally disposed within the ferrule will become aligned with an optical cable that is inserted within the opposing end 26 of the housing. The present invention is an advancement over the prior art receptacle through its inclusion of the cylindrical spring 30 within the bore 14 of the housing 12. Applicant's utilization of the cylindrical spring depicted in FIGS. 1-3, particularly as engaged within the bore 14 utilizing applicant's engagement method disclosed hereinbelow results in a receptacle having improved features over the receptacles disclosed in the prior art, as discussed previously. As is best seen in FIGS. 6 and 7, in the present invention 10 the diameter of the central bore 14 is significantly greater than the diameter of the standard ferrule 27 that will be inserted therewithin. A cylindrical spring 30 is disposed within the bore 14, and a shoulder 28 is formed in the bore 14 as an upper stop on the inward insertion of the cylindrical spring 30 within the bore 14. Following the insertion of the spring 30 within the bore 14 the material of the housing 12 proximate the lower end of the spring 30 is deformed into small protrusions 29 which hold the spring in place within the bore 14 of the housing 12.

Figure 1:
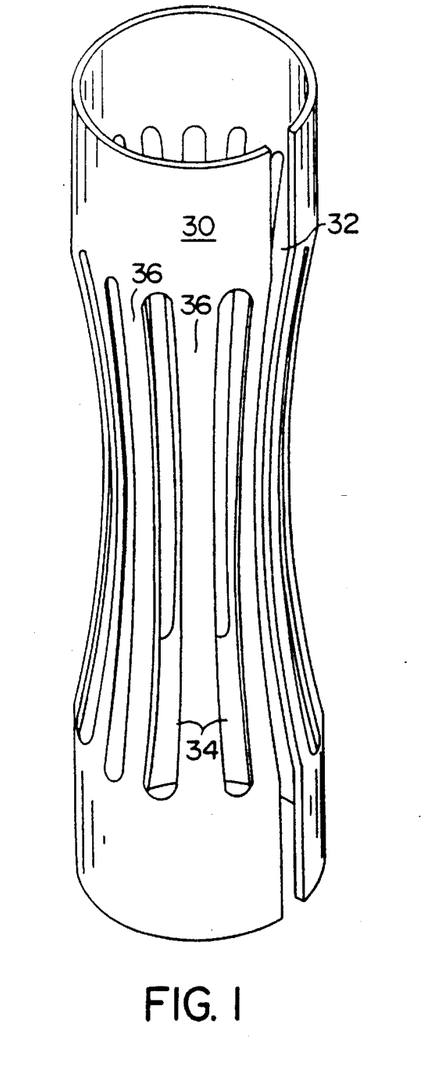
FIG. 1 is a perspective view of a cylindrical spring forming a part of the present invention.

Enlarged depictions of the spring 30 are provided in FIGS. 1, 2 and 3. Cylindrical springs are known in the prior art. The cylindrical spring 30 is formed from a thin-walled resilient material that is formed into a cylindrical shape. A gap 32 is formed in the wall along the length of the cylindrical spring, such that the spring 30 may be compressed in its diameter when inserted into a bore, such as bore 14. A plurality of long, narrow slots 34 are formed through the wall of the cylindrical spring 30, these slots being parallel to the longitudinal axis of the cylindrical spring 30. The removal of the wall material occasioned by the slots 34 results in the formation of a plurality of long, narrow spring elements 36 that are aligned parallel to the longitudinal axis of the cylindrical spring 30. The slots are formed such that the spring elements 36 are uniformly, radially disposed relative to the central axis of the cylindrical spring, as depicted in FIG. 3, which is a top plan view of the cylindrical spring 30.

To create the spring resilience necessary for the effective operation of the cylindrical spring, the individual spring elements 36 are deformed inwardly toward the central axis of the cylindrical spring 30, such that the diameter of the cylindrical spring 30 at its midpoint is substantially less than its diameter at either end.

FIG. 4 depicts a prior art electrical connector 40 that utilizes an electrically-conductive cylindrical spring 42. As depicted in FIG. 4, the electrical conductor 40 includes an electrically insulated outer housing 44 which encloses an electrically-conductive inner housing 46. A spring-holding cavity 48 is formed into the electrically- conductive inner housing 46 to contain the cylindrical spring 42. It is therefore to be understood that a bare electrical wire having a diameter that is greater than the central diameter of the cylindrical spring 42 but less than the outer diameter of the spring 42 can be inserted into the spring 42 to make electrical connection from the wire through the conductive spring to the electrically-conductive inner housing 46 and the electrical lead 49 which connects thereto.

The usage of the cylindrical spring in the present invention differs in at least two significant aspects from its use in the electrical connector of FIG. 4. Firstly, in the present invention the cylindrical spring 30 does not act as a connector, but rather as an alignment device. Thus, the cylindrical spring 30 of the present invention may be formed from a non-electrically conductive material, whereas the prior art spring 42 must be electrically conductive to act as a connector. Secondly, connection of the prior art electrical device is through the spring elements of the spring whereas in the present invention connection occurs in the accurate alignment of the optical fiber within the ferrule with yet another optional fiber that must be inserted into the receptacle. Thus, as is depicted in FIG. 7, a second optical cable 25 is inserted into the end 26 of the housing 12 for alignment of the optical fibers within the ferrule 27 with the optical fiber within the second cable 25.

Figure 8:
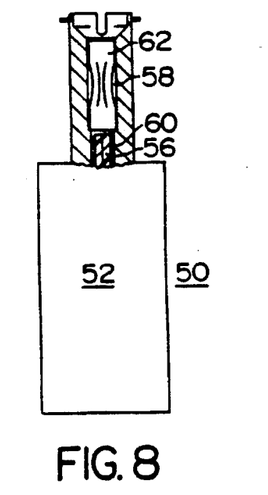
FIG. 8 depicts a partially broken-away cross-sectional view of an optical component having a receptacle of the present invention integrated therewith.
Figure 9:
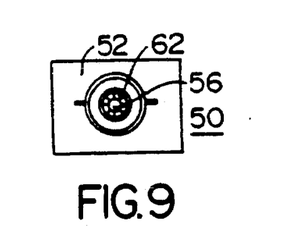
FIG. 9 is an end elevational view of the optical device depicted in FIG. 8.

FIGS. 8 and 9 depict an embodiment of the present invention that is adapted for use with an optical component. The optical component 50 is represented generally as a rectangular box 52 that has an optical fiber receptacle housing 54 (shown in a cutaway cross-section) engaged therewith. An optical fiber input/output cable 56 is fixedly engaged within the central bore 58 of the housing 54. The fiberoptic cable 56 may be engaged in the bore by epoxy 60 or other currently utilized methods. A cylindrical spring 62 is disposed within the central bore 58 of the housing 54 and a bayonet-type connection, similar to that depicted in FIG. 6, is formed in the input end of the housing 54. To achieve an accurate, repeatable alignment of ferrules that will be inserted into the housing 54, it is necessary to first insert a ferrule prior to the use of epoxy 60 or other permanent engagement of the input/output cable 56 within the housing. Upon the insertion of a ferrule within the housing 54, the spring elements of the cylindrical spring 62 will deform as the ferrule is inserted therethrough. The input/output cable 56 is then positionally adjusted until a maximum reading contact position is located. Then, while holding the input/output cable 56 in position, epoxy 60 is applied to permanently fix the position of the cable 56 within the bore of the housing 54. Thereafter, the ferrule may be removed and repeatedly reinserted into the housing 54. On each insertion, the cylindrical spring 62 will deform in a substantially identical manner to the prior insertion, such that the ferrule will be repeatedly, accurately aligned and connected to the input/output cable 56.

Figure 10:
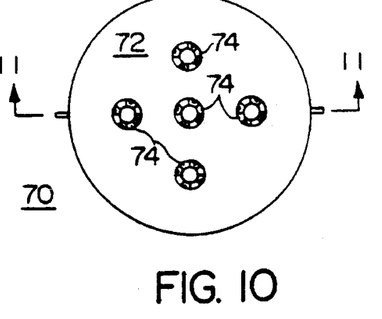
FIG. 10 is a top plan view of a multi-cable fiberoptic receptacle of the present invention.
Figure 11:
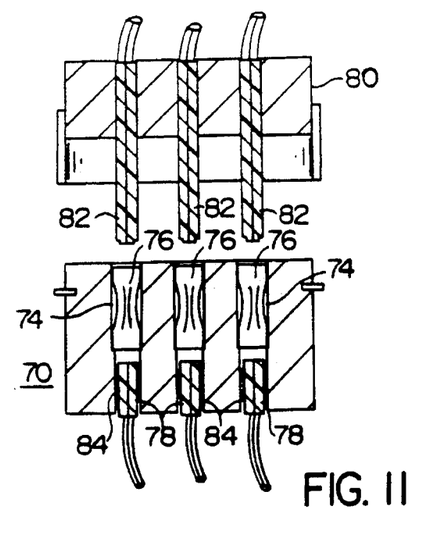
FIG. 11 is a cross-sectional view of the multi-cable fiberoptic receptacle depicted in FIG. 10, taken along lines 11—11 of FIG. 10 and depicting in cross-section a mating, multi-cable connector.

FIGS. 10 and 11 depict a multi-cable receptacle embodiment of the present invention. The multi-cable receptacle 70 includes a housing 72 having a plurality of connection bores 74 formed therethrough. As is best seen in FIG. 11, each connector bore 74 includes a cylindrical spring 76 disposed therewithin, and a fiberoptic cable 78 is fixedly disposed within the lower end of the bore 74. As is best seen in FIG. 11, a male connector 80 having a mating plurality of ferrules 82 projecting therefrom (shown in cross-section) is configured such that each ferrule 82 is aligned with the bores 74 formed in the receptacle housing 72. As with the embodiment depicted in FIGS. 8 and 9, the male connector 80 is first inserted into the receptacle 70 such that each ferrule 82 is inserted into an alignment spring 76. Each of the optical cables 78 is then individually aligned with its ferrule 82 for maximum output, whereupon the individual cables 78 are permanently affixed in place using epoxy 84 or a similar current technology. Thereafter, the male multi-connector 80 may be repeatedly connected with the receptacle 70 and a repeatable, high precision alignment of each ferrule 82 is assured through the repeatable deformation of the cylindrical alignment springs 76.

Figure 12:
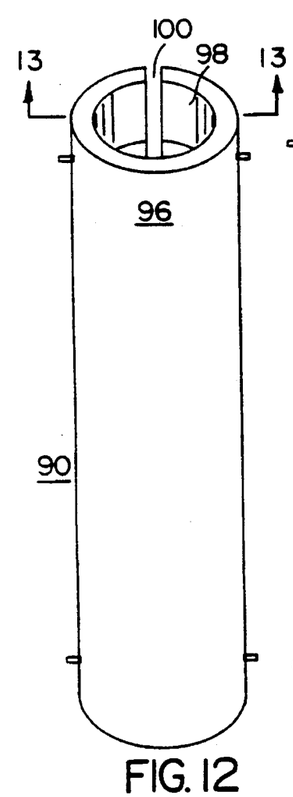
FIG. 12 is a perspective view of a connector for two ferrules of the present invention.
Figure 13:
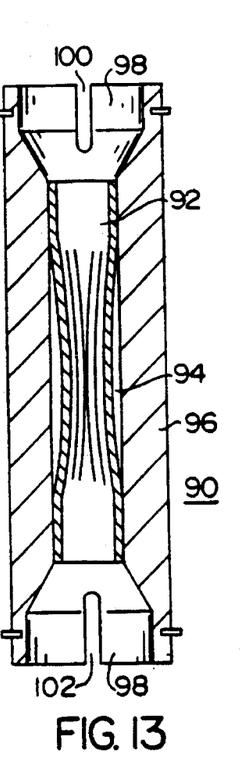
FIG. 13 is a cross-sectional view of the connector depicted in FIG. 12 taken along lines 13—13 of FIG. 12.

FIGS. 12 and 13 depict a fiberoptic connector for joining two ferrules together. The connector 90 includes an elongated cylindrical spring 92 that is disposed within a central bore 94 formed in the cylindrical housing 96. Each end of the cylindrical housing 96 is formed with a ferrule type connector configuration 98 that is similar to that depicted in FIGS. 5, 6 and 7. It is therefore to be appreciated that a ferrule may be inserted into each end of the housing 96, such that the optical fiber tips of the ferrules make contact proximate the center of the elongated cylindrical spring 92. Due to the repeatable deformation of the spring elements of the cylindrical spring 92, and because the two ferrules are each receiving spring forces from the same spring elements of the cylindrical spring 92, the two ferrules will be aligned by the spring in a similar and repeatable manner, such that the connector 90 will repeatedly, accurately align to ferrules that are inserted therewithin. In the preferred embodiment the two ferrule alignment slots 100 and 102 are aligned on the same side of the housing 96. With this slot alignment any similar defects in the two ferrules (such as out of roundness) will tend to be equally treated by the spring elements, thus leading to greater alignment accuracy.

Figure 14:
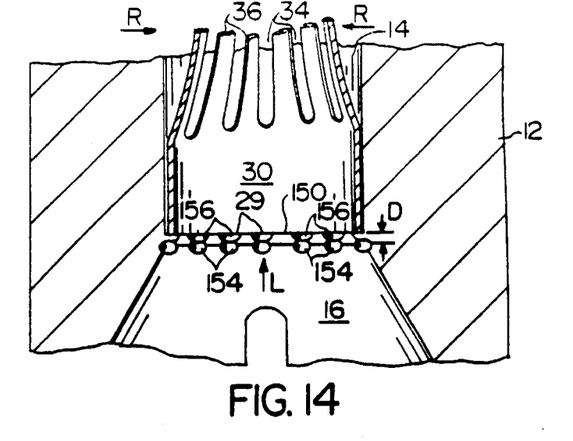
FIG. 14 is an expanded view of the cylindrical spring engagement method shown generally in FIG. 6.
Figure 15:
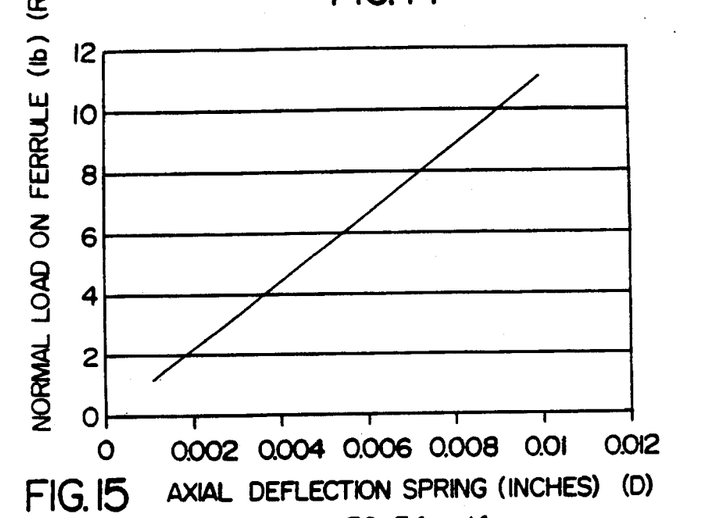
FIG. 15 is a graph depicting the relationship between the axial displacement of a cylindrical spring and the radial load upon a spring element caused thereby.

FIG. 14 depicts an engagement method that is advantageously utilized with the cylindrical spring within the receptacles and connectors described hereinabove. FIG. 14 is an expanded view of the spring engagement portion of the receptacle depicted in FIG. 6. In the improved cylindrical spring engagement method, a cylindrical spring 30 is placed within the bore 14 of a receptacle for connector 12. A load force L is applied to the lower edge 150 of the wall of the cylindrical spring 30 in the direction of the longitudinal axis of the spring 30, which causes an upward displacement (D) of the bottom edge 150 of the wall of the spring 30. Because the spring 30 is formed from individual spring elements 36 which are separated by slots 34, the upward displacement (D) of the lower edge 150 will result in a inwardly radially directed force (R) upon of each of the individual spring elements 36. Thus, control of the axial mounting displacement (D) provides control over the radial alignment force (R) which the individual spring elements 36 apply to a fiberoptic ferrule that is inserted within the alignment spring. FIG. 15 is a graph which compares the longitudinal displacement (D) (in inches) with the radial force (R) (in lbs.) of individual spring elements 36 for a cylindrical spring composed of copper having a diameter of approximately 0.110 inches, a wall thickness of approximately 0.010 inches, a length of approximately 0.200 inches and nine individual spring elements, each having a width at the center of the spring of approximately 0.030 inches and a length of approximately 0.150 inches.

FIG. 14 depicts applicant's preferred method for applying an axial force to the spring 30 to achieve the displacement (D). As depicted therein, and as mentioned hereinabove with regard to FIG. 6, protrusions 29 are formed from the material of the housing 12 to hold the spring 30 in position. Each protrusion 29 is formed by the gouging out 154 of material from the inner surface 16 of the housing 12. The gouged out material 156 is forced against the lower edge 150 of the wall of the spring 30 to hold the spring in position within the bore 14. The gouging of the material 156 is accomplished by applying a force L to a gouging instrument which creates the gouged projections 156, and the degree of force L determines the degree of gouging and hence the amount of displacement (D) of the spring 30.

Figure 16:
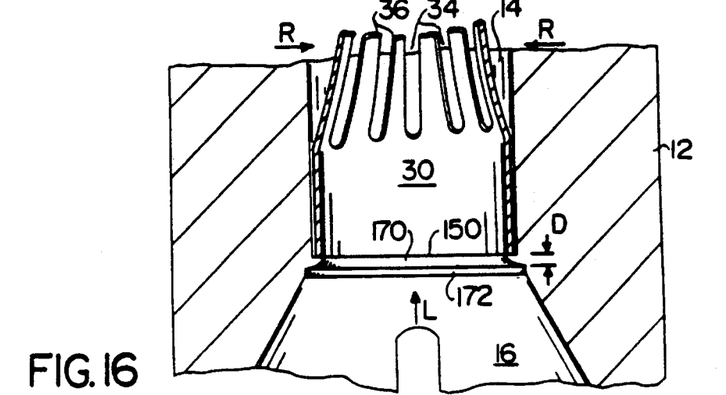
FIG. 16 depicts an alternative spring engagement method from that depicted in FIG. 14.

FIG. 16 depicts an alternative method for the engagement of a cylindrical spring 30 within the bore 14 of a receptacle or connector 12. As depicted in FIG. 16, a fairly uniform cylindrical band of housing material 170 has been gouged from the inner wall 16 of the receptacle 12. A thin, substantially cylindrically shaped gouged area 172 is therefore formed in the inner wall 16. As with the engagement embodiment depicted in FIG. 14, the longitudinal force L utilized to gouge the material 170 creates a longitudinal displacement (D) in the lower edge 150 of the wall of the spring 30. The gouged material 170 serves to hold the spring 30 in place and retain the longitudinal displacement.

Figures 17, 18, 19:
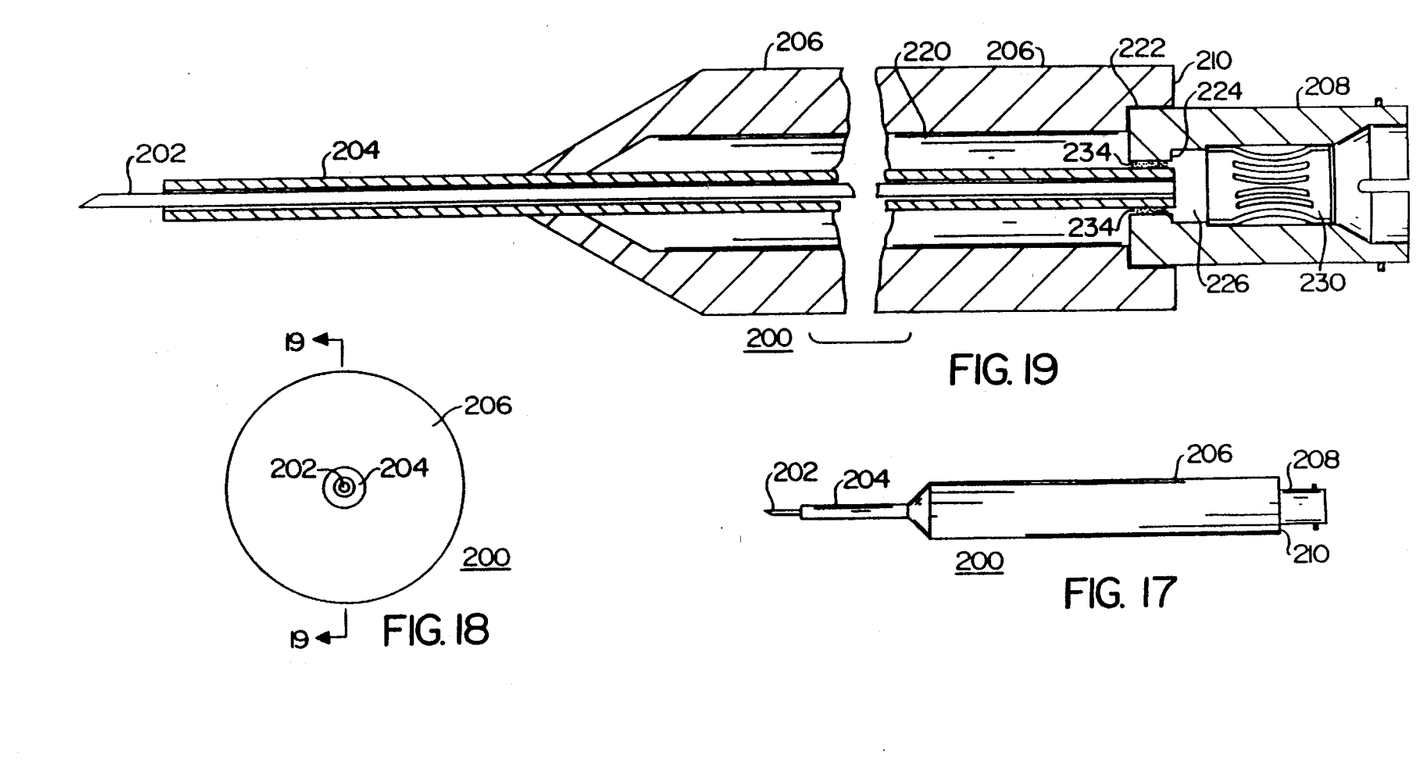
FIG. 17 is a side elevational view of a fiberoptic medical probe of the present invention.
FIG. 18 is an end elevational view of the fiberoptic medical probe depicted in FIG. 17.
FIG. 19 is a cross-sectional view of the medical probe depicted in FIG. 18 taken along lines 19—19 of FIG. 18.

FIG. 17 is a side elevational view of a fiberoptic medical probe 200 of the present invention. The probe 200 includes an optical fiber 202 that is axially disposed within the bore of a metal tube 204. The tube 204 is axially disposed within the bore of a cylindrical handle 206, and a optical fiber connecting receptacle 208 is engaged to the rearward end 210 of the handle 206. The receptacle 208 contains an alignment spring of the present invention, as disclosed hereinabove, such that an optical cable having a mating ferrule may be engaged with receptacle 208 in the manner described hereinabove with regard to FIG. 8.

FIG. 18 depicts an enlarged end elevational view of the probe depicted in FIG. 17, and FIG. 19 depicts a cross-sectional view taken along lines 19—19 of FIG. 18. As is best seen in FIG. 19, the optical fiber 202 and its tubular housing 204 extend through a bore 220 that is axially formed within a generally cylindrical handle 206. The receptacle 208 is engaged within a recess 222 formed in the end 210 of the handle 206. The optical fiber 202 and tubular housing 204 terminate within the forward end 224 of the bore 226 of the receptacle 208 which holds a cylindrical alignment spring 230 of the present invention. This configuration of the optical fiber 202 terminating within the end 224 of the receptacle 208 proximate the cylindrical spring 230 is similar to the optical device 52 depicted in FIG. 8 and described hereinabove. It is therefore to be realized that an optical cable having a ferrule disposed upon the end thereof may be inserted within the receptacle 208 such that the alignment spring 230 within the receptacle 208 will facilitate a repeatable optical connection with the optical fiber 202 of the probe 200.

To manufacture the device 200, the optical fiber 202 is first epoxied within the tube 204. Utilizing an optical bench, an optical ferrule is inserted within the spring 230 of the receptacle 208, and the tube 204 with its engaged optical fiber 202 is inserted within the end 224 of the receptacle 208. The tube 204 is then manipulated within the end 224 until the strongest optical signal is received in fiber 202, whereupon epoxy 234 is applied surrounding the tube 204 within the end 224 of the receptacle. After the epoxy 234 has hardened, the handle 206 is inserted over the end of the tube 204 and slid down the tube 204 into a snug fit of the receptacle 208 within the recess 222 of the housing 206.

Figure 20:
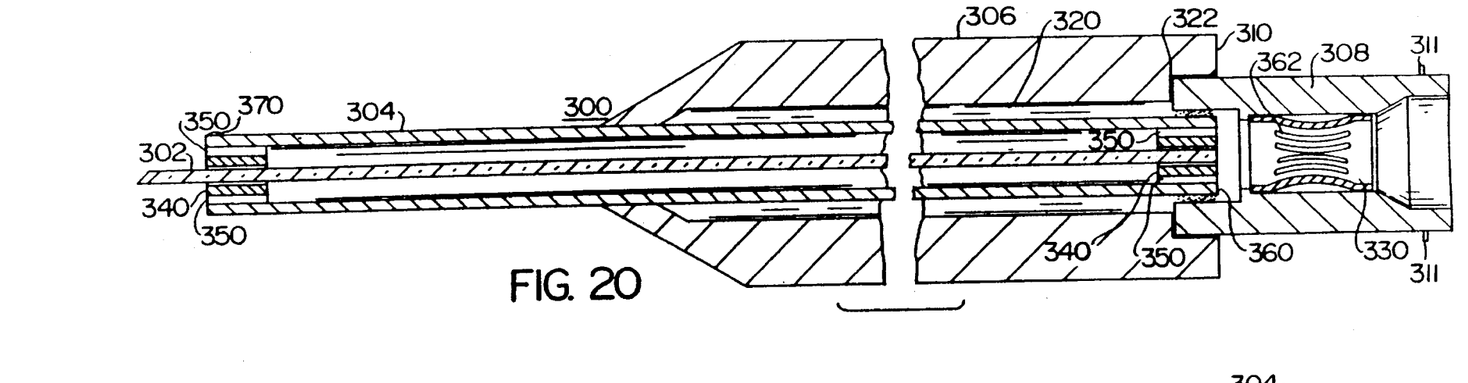
FIG. 20 is a cross-sectional view of an alternative embodiment of a liquid cooled fiberoptic medical probe of the present invention taken along lines 20—20 of FIG. 21.
Figure 21:
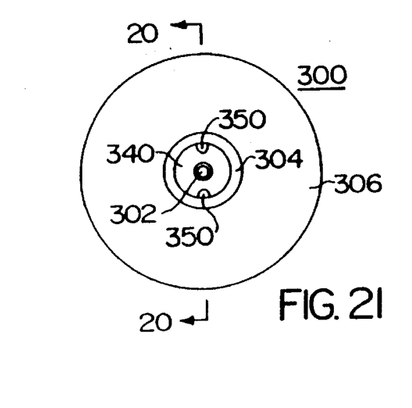
FIG. 21 is an end elevational view of the fiberoptic medical probe depicted in FIG. 20.
Figure 22:
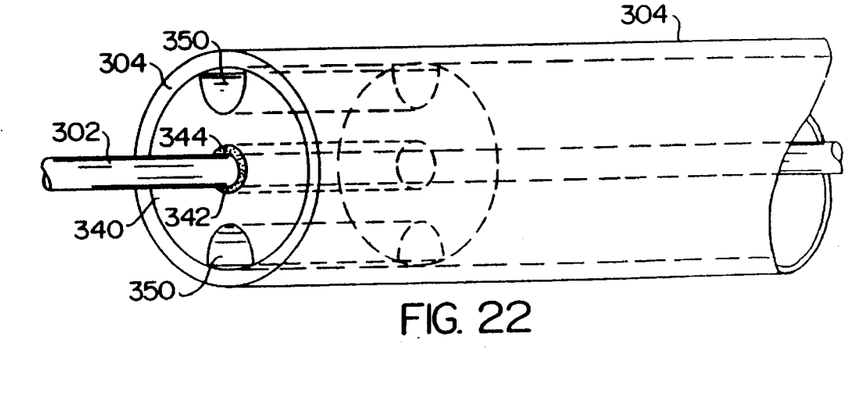
FIG. 22 is an expanded perspective view of the tip of the medical probe depicted in FIGS. 20 and 21.

FIGS. 20 and 21 depict an alternative embodiment 300 of the medical probe of the present invention that is air or liquid cooled. FIG. 20 is a cross-sectional view taken along lines 20—20 of FIG. 21, wherein FIG. 21 is an end elevational view similar to FIG. 18. FIG. 22 is an expanded perspective view of the tip of the probe depicted in FIGS. 20 and 21. As depicted in FIGS. 20, 21 and 22, the medical probe 300 includes an optical fiber 302 that is disposed within the central bore of a cylindrical tubular housing 304. The tubular housing 304 is centrally disposed within a bore 320 formed within a generally cylindrical handle 306, and a receptacle 308 having a cylindrical spring 330 disposed therewithin is engaged within a recess 322 formed at the end 310 of the handle 306.

The significant difference between the medical probe depicted in FIGS. 20, 21 and 22 and the medical probe depicted in FIGS. 18 and 19 is the utilization of coolant flow inserts 340 within the tubular housing 304 to both hold the optical fiber 302 in a centered orientation and to permit the flow of coolant air or liquid through the tubular housing 304. As is best seen in FIG. 22, the coolant flow insert 340 is a short, generally cylindrical, solid insert which is dimensioned to fit snugly within the bore of the tubular housing 304. An optical fiber bore 342 is axially formed through the insert 340 through which the optical fiber 302 passes. In the preferred embodiment, epoxy 344 is utilized to hold the optical fiber 302 within the bore 342. Coolant channels 350, of which two are shown, are formed in an axial direction through the insert 340 to permit coolant air or liquid to pass through the tubular housing 304. As depicted in FIG. 320, a coolant insert 340 is disposed at each end of the tubular housing 304 to hold the optical fiber 302 in a centralized orientation and to permit the inletting and outletting of coolant air or liquid. In the preferred embodiment of FIGS. 20, 21 and 22, the coolant air or liquid is introduced into the probe 300 through the receptacle 308 and into the tubular housing 304 through its internal end 360. The coolant air or fluid passes through the receptacle 308 by virtue of the slots 362 formed between the spring elements of the cylindrical spring 330. The coolant air or liquid passes through the tubular housing 304 to cool the optical fiber contained therewithin and passes out of the tubular housing at its front end 370 through the channels 350 formed in the insert 340.

Figures 23, 24, 25, 26:
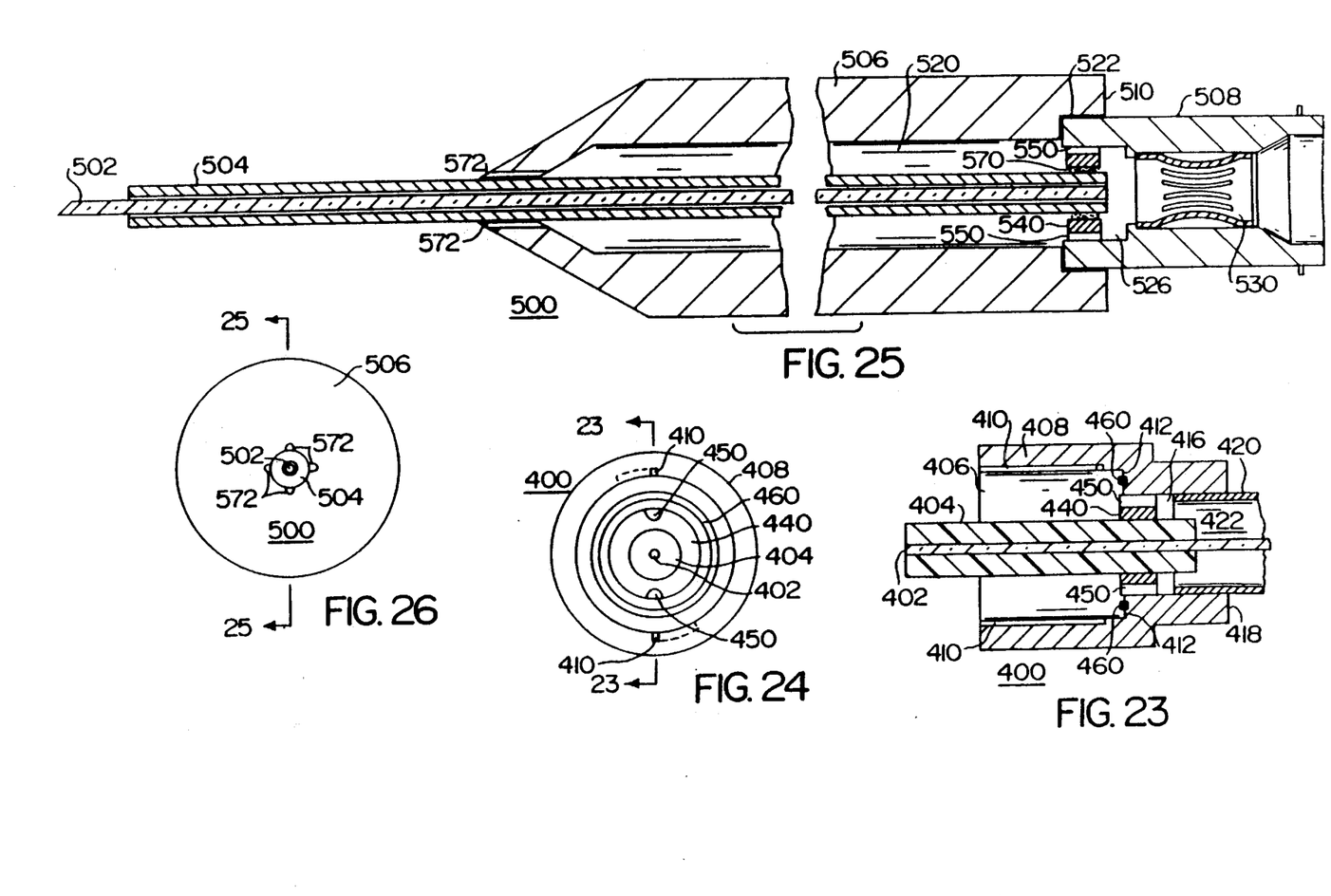
FIG. 23 is a cross-sectional view of a mating ferrule connector for connection with the medical probe depicted in FIG. 20, taken along lines 23—23 of FIG. 24.
FIG. 24 is an end elevational view of the ferrule connector depicted in FIG. 23.
FIG. 25 is a cross-sectional view of another alternative embodiment of the medical probe of the present invention, taken along lines 25—25 of FIG. 26.
FIG. 26 is an end elevational view of the medical probe depicted in FIG. 25.

FIGS. 23 and 24 depict a connector that includes an air or liquid cooling system, and which is adapted for connection with the probe 300. FIG. 23 is a cross-sectional view taken along lines 23—23 of FIG. 24, and FIG. 24 is an end elevational view of the connector. As depicted in FIGS. 23 and 24, the connector 400 includes an optical fiber 402 that is engaged within the central bore of a ferrule 404. The ferrule 404 is centrally disposed within a cylindrical bore 406 that is formed within a generally cylindrical connector housing 408. The diameter of the bore 406 is slightly larger than the diameter of the receptacle 308, such that the receptacle 308 will slidably fit within the bore 406. Small channels 410 are formed in the wall of the bore 406 to engage the bayonet-type attachment pins 311 of the receptacle 308. A shoulder 412 is formed at the inward end of the bore 406 within the housing 408 and a reduced diameter optical cable bore 416 is formed through the housing from the shoulder 412 to the rearward end 418 of the housing. An optical cable 420 is fixedly engaged within the bore 416 of the housing 408. The optical cable 420 includes the optical fiber 402 that is surrounded by a hollow cylindrical space 422 that is bounded by the walls of the cable 420. The space 422 is provided for the passage of coolant air or liquid through the connector 400.

To permit the coolant air or liquid to pass from the passage 422 within the optical cable 420 through the connector 400, an insert 440, that is similar in design to insert 340, is engaged within the bore 416. That is, the insert 440 is a short, generally cylindrical member having a central bore formed therethrough in which the ferrule 404 is engaged. Coolant passage channels 450 are longitudinally formed through the insert 440 to permit coolant air or liquid to pass therethrough.

It is therefore to be understood that upon the bayonet-type engagement of connector 400 with receptacle 308 of the probe 300 that the optical fiber 402 will become aligned with the optical fiber 302 of the probe through the function of the cylindrical spring 330. Coolant air or liquid from the passage 422 in the optical cable 420 will pass through the coolant passage 450 of the insert 440 and into the base of the receptacle 308. The coolant air or liquid will then pass through the slots 362 formed in the cylindrical spring 330 and thereafter through the tubular housing 304 of the probe 300 as described hereinabove. A sealing O-ring 460 is preferably disposed within a channel formed in the shoulder 412 of the housing 408 to promote a seal between the connector housing 408 and the receptacle housing 308, such that the coolant air or liquid does not leak out at the connecting interface.

FIGS. 25 and 26 depict yet another alternative embodiment 500 of the probe of the present invention. FIG. 5 is a cross-sectional view of the probe 500 taken along lines 25—25 of FIG. 26, and FIG. 26 is an end elevational view of probe 500. As depicted in FIGS. 25 and 26, an optical fiber 502 is disposed within the central bore of a tubular housing 504, and the tubular housing 504 is centrally disposed within a cavity 520 that is centrally located within a generally cylindrical handle 506. A connecting receptacle 508 having a centrally disposed cylindrical alignment spring 530 disposed therewithin, is engaged within a recess 522 formed within the end 510 of the handle 506. A generally cylindrical coolant insert 540, which is similar to the inserts 340 and 440 described hereinabove, is engaged within the inner cylindrical bore 526 of the receptacle 508. The insert 540 has a centrally disposed bore 570 having a diameter that is significantly larger than the diameter of the end of the tubular housing 502 disposed therewithin. The enlarged diameter of bore 570 is utilized to permit the alignment and epoxying of the end of the tubular housing 502 within the bore 570, as was discussed hereinabove regarding the alignment of the tubular housing 204 within the receptacle 208 utilizing epoxy 234. It is therefore to be realized that coolant air or liquid will now pass through the receptacle 508 and through the passages 550 into the bore 520 formed in the handle 506. To permit the coolant air or liquid to exit from the passage 520, coolant exit passages 572 are formed through the handle 506 proximate the engagement of the tubular housing 504 within the handle 506. It is to be understood that a coolant connector 400 is to be engaged with receptacle 408 to provide coolant air or liquid within receptacle 508.

Figures 27, 28:
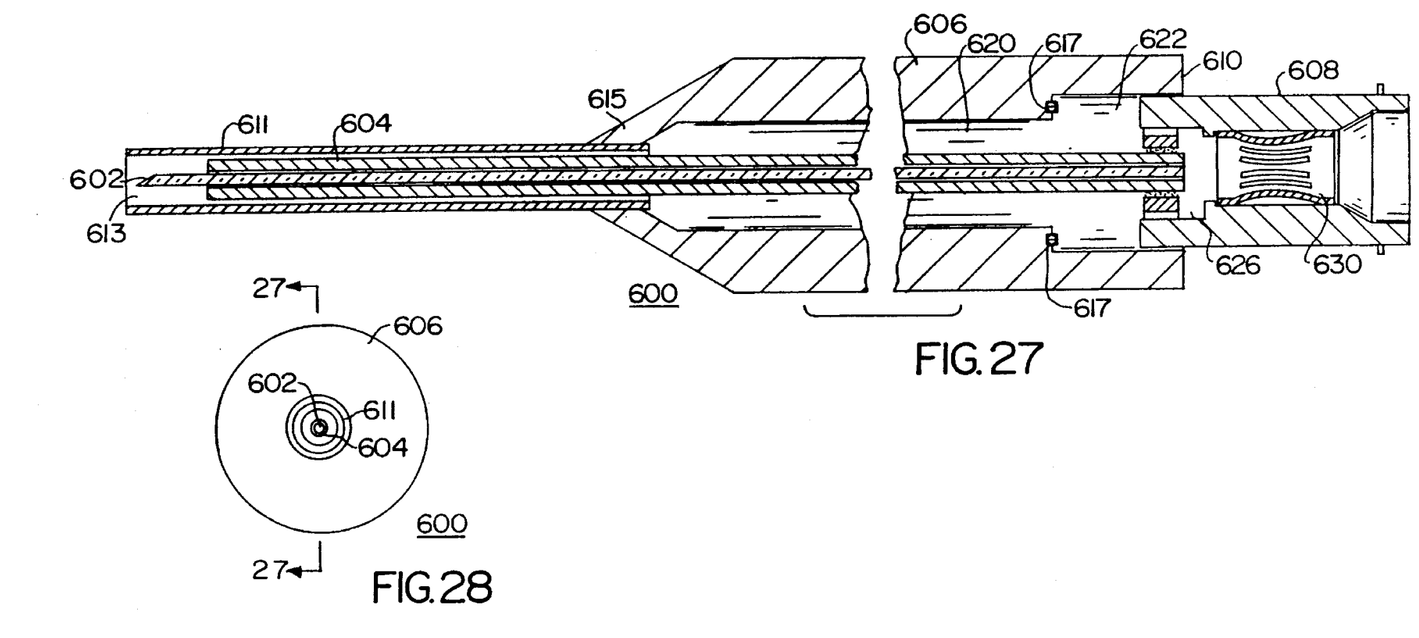
FIG. 27 is a cross-sectional view of yet another alternative embodiment of the medical probe of the present invention, taken along lines 27—27 of FIG. 28.
FIG. 28 is an end elevational view of the medical probe depicted in FIG. 27.

FIGS. 27 and 28 depict a medical probe 600 which is a further embodiment of the present invention. FIG. 27 is a cross-sectional view of probe 600 taken along lines 27—27 of FIG. 28, and FIG. 28 is an end elevational view of the probe 600. A comparison of probe 600 with probe 500 described hereinabove, reveals that probe 600 includes the identical optical fiber 602, tubular housing 604, receptacle 608, alignment spring 630, insert 640 as was described hereinabove in relation to probe 500. Probe 600 differs from probe 500 in the structure and function of the handle.

As best depicted in FIG. 27, handle 606 is formed with an elongated recess 622 which is laterally, slidably engaged with the outer surface of the cylindrical housing 608. A cylindrical tube 611 having a central bore 613 that is larger than the diameter of the tubular housing 604 projects forwardly from the forward end 615 of the handle 606 to surround and protect the tip of the optical fiber 602. The diameter of the bore 613 is sufficiently larger than the diameter of the tubular member 604 to permit coolant air or liquid to pass through bore 613 in surrounding contact with the tubular housing 604. When probe 600 is to be used, the handle 606 is slid axially back upon receptacle 608 to the extent of the enlarged recess 622, whereupon the tip of the optical fiber 602 will be exposed relative to its prior enclosure within the bore 613 of tube 611. An O-ring seal 617 may be engaged within the shoulder of the recess 622 to promote a seal between the handle 606 and the receptacle 608 when the handle 606 is slid backward for use. When used, coolant liquid will pass through the bore 620 in the handle 606 and exit through the space provided by bore 613 surrounding tubular member 604.

It is to be understood that the various preferred embodiments of the present invention have been depicted and described with reference to a bayonet-type of engagement mechanism, whereas it is well known that other types of engagement mechanisms, such as threaded engagement mechanisms, exist, and can easily be substituted therefor. It is therefore to be understood that the scope of the present invention is not to be limited to the types of engagement mechanisms of the fiberoptic components.

While the invention has been particularly shown and described with reference to certain preferred embodiments, it will be understood by those skilled in the art that various alterations and modifications in form and in detail may be made therein. Accordingly, it is intended that the following claims cover all such alterations and modifications as may fall within the true spirit and scope of the invention.

I claim:

1. A fiberoptic probe comprising:

a handle means having a handle bore formed therein;

an optical fiber passage means being disposed within said handle bore and an optical fiber is being held in said passage means;

an optical fiber receptacle being engaged to said handle, and including a receptacle housing;

said receptacle housing having a generally cylindrical receptacle bore disposed therethrough, and having a longitudinal central axis thereof; a ferrule of an optical fiber connector is being held in said receptacle bore;

said optical fiber passage means having a first end disposed within said handle means proximate said receptacle housing, such that an optical connection between said optical fiber and said ferrule may be accomplished upon the insertion of said ferrule within said receptacle bore;

a probe coolant passage being formed through said receptacle housing, said probe coolant passage having an inlet portion and an outlet portion, and functioning for the inletting and outletting of a coolant medium therethrough; and said fiber optic further including an optical fiber connector means being engaged with said receptacle housing, said optical fiber connector means including a connector housing, said connector housing having a connector bore formed therein;

said ferrule being disposed within said connected bore and having an optical fiber being centrally disposed therewithin;

a connector coolant passage being formed through said connector housing, said connector coolant passage having an inlet portion and an outlet portion, and functioning for the inletting and outletting of a coolant medium therethrough.

2. A fiberoptic probe as described in claim 1 wherein said optical connector means further includes a coolant flow insert being disposed within said connector housing, said insert having a central bore for the projection of said ferrule therethrough, and at least one coolant channel to permit said coolant medium to flow therethrough.

3. A fiberoptic probe as described in claim 2 wherein a coolant seal member is disposed within said optical fiber connector bore.

4. A fiberoptic probe comprising:

a handle means having a handle bore formed therein;

an optical fiber passage means being disposed within said handle bore and an optical fiber is being held in said passage means;

an optical fiber receptacle being engaged to said handle, and including a receptacle housing;

said receptacle housing having a generally cylindrical receptacle bore disposed therethrough, and having a longitudinal central axis thereof; a ferrule of an optical fiber connector is being held in said receptacle bore;

said optical fiber passage means having a first end disposed within said handle means proximate said receptacle housing, such that an optical connection between said optical fiber and said ferrule may be accomplished upon the insertion of said ferrule within said receptacle bore;

a probe coolant passage being formed through said receptacle housing, said probe coolant passage having an inlet portion and an outlet portion, and functioning for the inletting and outletting of a coolant medium therethrough; and wherein said probe coolant passage includes an optical fiber coolant passage portion being formed within said optical fiber passage means to permit exposure of said optical fiber to said coolant medium.

5. A fiberoptic probe as described in claim 4 wherein a coolant flow insert is disposed in said first end of said optical fiber passage means, said insert having a central bore for the projection of said optical fiber therethrough and at least one coolant channel to permit said coolant medium to flow therethrough; and wherein a second coolant flow insert is disposed at a distal end of said optical fiber passage means to permit the flow of said coolant medium therethrough.

6. A fiberoptic probe comprising:

a handle means having a handle bore formed therein;

an optical fiber passage means being disposed within said handle bore and an optical fiber is being held said passage means;

an optical fiber receptacle being engaged to said handle, and including a receptacle housing;

said receptacle housing having a generally cylindrical receptacle bore disposed therethrough, and having a longitudinal central axis thereof; a ferrule of an optical fiber connector is being held in said receptacle bore;

said optical fiber passage means having a first end disposed within said handle means proximate said receptacle housing, such that an optical connection between said optical fiber and said ferrule may be accomplished upon the insertion of said ferrule within said receptacle bore; and a probe coolant passage being formed through said receptacle housing, said probe coolant passage having an inlet portion and an outlet portion, and functioning for the inletting and outletting of a coolant medium therethrough; and wherein said handle means is slidably engagable with said optical fiber receptacle, and wherein a coolant medium seal member is disposed between said handle means and said optical fiber receptacle; and wherein a coolant passage tube is engaged to said handle means to project forwardly therefrom, such that the optical fiber passage means is disposed within said coolant passing tube, whereby said coolant medium flows within said coolant passage tube and makes contact with said optical fiber passage means.

* * * * *